US009615327B2

United States Patent
Xie et al.

(10) Patent No.: US 9,615,327 B2
(45) Date of Patent: Apr. 4, 2017

(54) TERMINAL POWER-SAVING METHOD AND TERMINAL POWER-SAVING DEVICE, AND NETWORK-SIDE POWER-SAVING DEVICE

(71) Applicant: ZTE CORPORATION, Shenzhen, Guangdong (CN)

(72) Inventors: Baoguo Xie, Shenzhen (CN); Zhijun Li, Shenzhen (CN); Haris Zisimopoulos, Shenzhen (CN)

(73) Assignee: ZTE Corporation (CN)

( * ) Notice: Subject to any disclaimer, the term of this patent is extended or adjusted under 35 U.S.C. 154(b) by 25 days.

(21) Appl. No.: 14/396,813

(22) PCT Filed: Apr. 11, 2013

(86) PCT No.: PCT/CN2013/074059
§ 371 (c)(1),
(2) Date: Oct. 24, 2014

(87) PCT Pub. No.: WO2014/005452
PCT Pub. Date: Jan. 9, 2014

(65) Prior Publication Data
US 2015/0117285 A1    Apr. 30, 2015

(30) Foreign Application Priority Data
Apr. 26, 2012    (CN) .......................... 2012 1 0126666

(51) Int. Cl.
*H04W 52/02*    (2009.01)
(52) U.S. Cl.
CPC ... *H04W 52/0209* (2013.01); *H04W 52/0216* (2013.01); *Y02B 60/50* (2013.01)
(58) Field of Classification Search
CPC .......... H04W 52/0209; H04W 52/0216; Y02B 60/50
See application file for complete search history.

(56) References Cited

U.S. PATENT DOCUMENTS 8,000,706 B2 *  8/2011  Lee ...................... H04J 11/0093
                                              455/435.1
8,477,811 B2 *  7/2013  Kitazoe ............... H04W 76/045
                                              370/231
(Continued)

FOREIGN PATENT DOCUMENTS

CN    102111856    6/2011
CN    102118739    7/2011
(Continued)

OTHER PUBLICATIONS

International Search Report for PCT/CN2013/074059, English translation attached to original, Both completed by the Chinese Patent Office on Jul. 9, 2013, All together 7 Pages.
(Continued)

*Primary Examiner* — Phuc Tran
(74) *Attorney, Agent, or Firm* — Brooks Kushman P.C.

(57) ABSTRACT

A terminal power-saving method, a terminal power-saving device, and a network-side power-saving device are disclosed. The terminal power-saving device includes a power-saving parameter receiving module and a power-saving execution module. The power-saving parameter receiving module is configured to receive an idle-mode power-saving parameter from a network side, and the power-saving execution module is configured to execute a power-saving operation according to the idle-mode power-saving parameter after the terminal enters an idle mode. When a terminal accessing a 3GPP network has a power-saving requirement, the terminal can perform more optimal power-saving control through a long DRX parameter in a connection mode, and in an idle mode the terminal can receive paging message in an active window time interval and close a wireless transceiver system in a dormant time interval, thereby greatly reducing the power consumption of the terminal, and achieving the purpose of power-saving.

17 Claims, 8 Drawing Sheets

(56) References Cited

U.S. PATENT DOCUMENTS

| | | | | |
|---|---|---|---|---|
| 8,626,163 B2* | 1/2014 | Maeda | ............... | H04W 48/02 455/422.1 |
| 2012/0127934 A1* | 5/2012 | Anderson | ......... | H04W 72/0406 370/329 |
| 2013/0003629 A1* | 1/2013 | Jeong | ............ | H04W 52/0216 370/311 |
| 2014/0011519 A1* | 1/2014 | Lee | ..................... | H04W 8/24 455/456.1 |

FOREIGN PATENT DOCUMENTS

| | | |
|---|---|---|
| CN | 102143562 | 8/2011 |
| EP | 2385734 | 11/2011 |
| WO | 2011084024 | 7/2011 |

OTHER PUBLICATIONS

Supplementary European Search Report for Application No. 13813924.1 dated May 4, 2015.

\* cited by examiner though, the RNC-SGSN-GGSN for this transmission, the tunnel is based on the GPRS tunnel protocol (abbreviated as GTP), and the reliable transmission of the data information is realized through the GTP tunnel.

TERMINAL POWER-SAVING METHOD AND TERMINAL POWER-SAVING DEVICE, AND NETWORK-SIDE POWER-SAVING DEVICE

CROSS-REFERENCE TO RELATED APPLICATION

This application is the U.S. national phase of PCT Appln. No. PCT/CN2013/074059 filed Apr. 11, 2013 which claims priority to Chinese Application No. 201210126666.2 filed Apr. 26, 2012, the disclosures of which are incorporated in their entirety by reference herein.

TECHNICAL FIELD

The present document relates to the communication field, and in particular, to a terminal power-saving method and a terminal power-saving device and a network-side power-saving device of a terminal in a 3GPP network.

BACKGROUND OF THE RELATED ART

At present, the Machine to Machine (abbreviated as M2M) communication service is already used widely gradually, for example, the application, such as, the logistics system, the remote meter reading, the smart home, etc. The M2M service provider mainly uses the current wireless network to develop the M2M service, for example, the Packet System (PS) network, such as, the General Packet Radio Service (abbreviated as GPRS) network, the Evolved Packet System (abbreviated as EPS) network, etc.

The GPRS is evolved to the Universal Mobile Telecommunication System Packet Switch (abbreviated as UMTS PS) field in the third generation mobile systems. FIG. 1 is the network framework of the UMTS PS. As shown in FIG. 1, the network framework includes the following network elements:

the Radio Network System (abbreviated as RNS), and the RNS includes the NodeB and the Radio Network Controller (abbreviated as RNC); wherein, the NodeB provides the air interface connection for the terminal; the RNC is used mainly for managing the Radio Resource and controlling the NodeB. The RNC connects the NodeB through the Iub interface, and the terminal accesses the packet core network of the UMTS through the RNS;

the Serving GPRS Support Node (abbreviated as SGSN), connected with the RNS through the Iu interface, used for storing the location information of the routing area of the user and responsible for the security and the access control;

the Gateway GPRS Support Node (abbreviated as GGSN), connected with the SGSN through the Gn interface inside, and used for being responsible for assigning the terminal IP address and realizing the gateway function to the outside network;

the Home Location Register (abbreviated as HLR), connected with the SGSN through the Gr interface, connected with the GGSN through the Gc interface, and used for storing the subscription data of the user and the SGSN address in which the user currently locates;

the Packet Data Network (abbreviated as PDN), connected with the GGSN through the Gi interface, and used for providing the service network for the user based on the packet.

In FIG. 1, the machine type communication (abbreviated as MTC) UE needs to transmit the data information to the MTC Server or other MTC UE through the GPRS network transmission. The GPRS network sets up the tunnel among The proposition of the System Architecture Evolution (abbreviated as SAE) is to enable the Evolved Packet System (abbreviated as EPS) network to provide much higher transmission rate and much shorter transmission delay, optimize the packet, and support the Mobility Management among the Evolved Universal Terrestrial Radio Access Network (abbreviated as E-UTRAN), the Universal Terrestrial Radio Access Network (UTRAN), the Wireless Local Area Network (abbreviated as WLAN) and other non-3GPP access networks.

FIG. 2 is the framework diagram of the EPS, as shown in FIG. 2, wherein, the network element included in the Evolved Radio Access Network (abbreviated as E-RAN) is an Evolved NodeB (abbreviated as eNodeB), used for providing the Radio Resource for the user access; the Packet Data Network (abbreviated as PDN) is a network for providing the service to the user; and EPC provides a much lower delay and allows more wireless access systems to access, which includes the following network elements:

the Mobility Management Entity (abbreviated as MME) is a control plane function entity and is a server for temporarily storing the user data, responsible for managing and storing the context of the UE (for example, the user identification, the mobility management state, the user security parameter, etc.), assigning the temporary identification for the user, and responsible for authenticating the user when the UE is resident in the tracing area or the network.

The Serving Gateway (abbreviated as SGW or S-GW) is a user plane entity, responsible for routing process of the user plane data, ending the downlink data of the UE in the idle (ECM_IDLE) state, managing and storing the context of the SAE bearer of the UE, such as, the IP bearer service parameter and the route information inside the network, etc. the SGW is the anchor point of the user plane within the 3GPP system, and one user can only have one SGW at the one moment.

The PDN Gateway (abbreviated as PGW or P-GW) is the gateway responsible for the UE to access the PDN, assigning user IP address, and also is the mobility anchor point of the 3GPP and non-3GPP access systems. The function of the PGW further includes the policy enforcement and charging support. A user can access a plurality of PGWs at the same moment. The Policy and Charging Enforcement Function (abbreviated as PCEF) also lies in the PGW.

Physically, the above-mentioned SGW and PGW may be combined, and the user plane network elements of the EPC system include the SGW and the PGW.

The Policy and Charging Rules Function (abbreviated as PCRF) is responsible for providing the policy controlling and charging rule for the PCEF.

The Home Subscriber Server (abbreviated as HSS) is responsible for permanently storing the user subscription data, and the content stored in the HSS includes the International Mobile Subscriber Identification (abbreviated as IMSI) of the UE, and the IP address of the PGW.

The MTC server is mainly responsible for the work, such as, the information collection and the data storage/processing of the MTC user equipment (MTC UE), etc., and able to perform essential management of the MTC UE.

The MTC UE is usually responsible for collecting the information of several collectors, and accessing the core network through the RAN node, and interacting data with the MTC Server.

In FIG. 2, the MTC UE needs to transmit the data information to the MTC Server or other MTC UE through the EPS network. The SAE network sets up the GTP tunnel between SGW-PGW for this transmission, and reliable transmission of the data information is realized through the GTP tunnel.

According to the M2M service requirement, it needs the network to realize all kinds of requirements, such as, activating the terminal and the little data bulk transmission, so the PS packet network framework is strengthened. The MTC strengthened framework of the PS network is shown in FIG. 3, and the MTC Interworking Function (abbreviated as IWF) network element and the relevant interface are introduced in the PS network framework. In the figure, the MTC Server is used for providing the M2M application control to the user, and the MTC Server is mainly responsible for the work, such as, the information collection and the data storage/processing of the MTC user equipment (MTC UE), etc., and able to perform the essential management of the MTC UE. The MTC IWF network element is responsible for performing the network topology hiding and the protocol conversion of the application layer and the bearing layer, adopting the MTCsp interface to connect with the MTC Server, adopting the S6m interface to connect with the HSS/HLR, and adopting the T5a/d to connect with the SGSN/MME; and it is connected with the PGW through the MTCi interface and serves for realizing the M2M service. The function of the existing MTC IWF is mainly receiving the activation message of the MTC Server, and sending the activation message to the MTC terminal through the relevant network element of the 3GPP network.

Because in the current network, a lot of MTC terminals need to adopt the battery powered mode, such as, the pressure sensor of the railway bridge, the water level monitoring sensor, the air quality monitoring sensor, the water meter reading terminal, etc., and they transmit the related monitoring data to the MTC server for processing in an acceptable time after collecting it, and then need to enter the power-saving mode to save the power. At present, generally, there are two kinds of modes for the terminal to save the electricity: one is to adopt the discontinuous reception (abbreviated as DRX) parameter in the connected state to control the intermittent service in order to achieve the goal of saving power, wherein, the terminal receives and dispatches the IP data packet in the time interval that the DRX parameter is enabled and does not receive and dispatch the data packet in the time interval that the DRX parameter is disabled. Another is the Idle mode; under this mode, the terminal guarantees the work of the communication module in the related art, in order to monitor the broadcast channel of the network, and other unnecessary application software, such as, on screen display, keyboard, etc., can be closed. When the network initiates the paging, the terminal needs to activate all modules and enter to the normal operation, and the terminal can set up the wireless connection and initiate the data service; the more optimal mode for saving the power is that: when the terminal under the idle mode can enter the dormant state, the terminal can close the wireless communication module and other unnecessary application software to reduce the power consumption to the maximum extent, and activates again and enters the normal operation when the terminal needs to initiate the service, and can initiate the access request and initiate the data service to the network.

In the related art, in the EPS network or the GPRS network, the current power-saving schemes are all controlled by the terminal; when the terminal does not in service, it can save the power consumption by adopting the frequency-reducing or closing the application program, for example, the mode, such as, closing the input/output module or the display module, making the processor switch to the power-saving mode, etc., but it will not notify the network side.

The above-mentioned terminal only adopt the mode, such as, closing the screen by the terminal, etc., to save the power under the idle mode, and the network side does not formulate power-saving policy for the terminal, so, even there is power-saving requirement on the terminal, the network side will still perform the operation, such as, the location update, the wireless paging, etc., according to the normal procedure, which makes the terminal in the power-saving mode receive the wireless signal and perform data processing frequently and is unable to obtain the optimum power-saving effect of the terminal.

The above-mentioned terminal in the idle mode enters the dormant state, although the power-saving result is very effective, the problem is that the 3GPP network does not perform the policy control on how to receive the paging by the terminal in the dormant time interval, which cause the 3GPP network unable to page the terminal in the dormant time interval after the terminal enters the dormant state by itself, such that the terminal paging service is unable to be realized. In addition, if the dormancy time is beyond the periodic time for the location update of the terminal, it may cause the 3GPP network side to initiate the implicit deactivation for the terminal, and the terminal needs to attach again to the network after exiting the dormant state, then it can initiate the uplink and downlink services, which causes the consumption of the signaling resources of the network and reduces the user experience.

Therefore, after the terminal accesses the 3GPP network, the terminal has a power-saving requirement, and the 3GPP network should be able to make the corresponding power-saving policy for the terminal and notify the terminal and each necessary network element of the network side. It guarantees that the terminal can both realize the purpose of power-saving and not influence the mobility management and the downlink service of the network side to the terminal, and prevents the unnecessary resource consumption of the signaling plane and the user plane at the network side at the same time, which both guarantees the optimization of the power-saving of the terminal and not reduces the user experience of the 3GPP.

SUMMARY OF THE INVENTION

The technical problem to be solved by the present document is to provide a terminal power-saving method and terminal power-saving device and a network-side power-saving device, to solve the problem that the control ability of the network side is deficient during the power-saving process of the terminal in the related art and provide the new solution for the power-saving problem of the terminal.

In order to solve the above-mentioned technical problem, the present document provides a terminal power-saving method, comprising: a terminal accessing a network, a network element of a network side determining an idle-mode power-saving parameter of the terminal and notifying the idle-mode power-saving parameter to the terminal, and the terminal executing a power-saving operation according to the idle-mode power-saving parameter after the terminal enters an idle mode.

The above-mentioned method further has the following characteristics:

the idle-mode power-saving parameter comprises a terminal activity time parameter, the activity time parameter comprises an active window time interval and a dormant time interval, and the terminal receives a paging message of the network side in the active window time interval and does not receive the paging message of the network side in the dormant time interval after entering the idle mode.

The above-mentioned method further has the following characteristics:

the terminal activity time parameter comprises a sleep time interval parameter, the sleep time interval comprises one or more the active window time intervals and the dormant time intervals, and the terminal executes a power-saving operation in the sleep time interval after entering the idle mode; a default value of the sleep time interval is a long periodicity Tracking Area Update (TAU) time parameter or a normal periodicity Tracking Area Update time parameter.

The above-mentioned method further has the following characteristics:

the idle-mode power-saving parameter further comprises a long periodicity Tracking Area Update (TAU) time parameter, and a value of the long periodicity TAU parameter is greater than a value of a normal periodicity Tracking Area Update time parameter.

The above-mentioned method further has the following characteristics:

the network element of the network side further determines a connection mode power-saving parameter of the terminal and notifies the connection mode power-saving parameter to the terminal, the connection mode power-saving parameter comprises a long discontinuous reception parameter, and a value of a data transceiving turn-off time in the long discontinuous reception parameter is greater than a value of a data transceiving turn-off time in a normal discontinuous reception parameter.

The above-mentioned method further has the following characteristics:

the network element of the network side determines that the terminal is a power-saving terminal according to a power-saving indication sent by the terminal, or, the network element of the network side determines that the terminal is a power-saving terminal according to an international mobile subscriber identification number (IMSI) indication of the terminal or an access point name (APN).

The above-mentioned method further has the following characteristics:

when the network element of the network side is a mobility management network element of the network side, the terminal activity time parameter of the terminal is determined according to at least one of a subscribed terminal activity time parameter, a reference terminal activity time parameter of a network element of a user plane, a reference terminal activity time parameter of a terminal side, and an operator policy.

The above-mentioned method further has the following characteristics:

when the network element of the network side is a network element of a user plane at the network side, the terminal activity time parameter of the terminal is determined according to at least one of a reference terminal activity time parameter of a network element of the user plane, a reference terminal activity time parameter of a terminal side, and an operator policy.

The above-mentioned method further has the following characteristics:

the mobility management network element of the network side determines a value used for the long periodicity Tracking Area Update time parameter in the idle mode and a value used for the long discontinuous reception parameter in the connection mode for the power-saving terminal according to an operator policy.

The above-mentioned method further has the following characteristics:

a mobility management network element of the network side does not perform a downlink paging directing at the terminal in a dormant time interval of the terminal; and a network element of a user plane at a network side does not send a downlink data packet directing at the terminal in a dormant time interval of the terminal.

In order to solve the above-mentioned technical problem, the present document further provides a terminal power-saving device, comprising: a power-saving parameter receiving module and a power-saving execution module; wherein, the power-saving parameter receiving module is configured to: receive an idle-mode power-saving parameter from a network side; and the power-saving execution module is configured to: execute a power-saving operation according to the idle-mode power-saving parameter after the terminal enters an idle mode.

The above-mentioned device further has the following characteristics:

the power-saving execution module is configured to: receive a paging message of the network side in an active window time interval of the idle-mode power-saving parameter and not receive the paging message of the network side in a dormant time interval of the idle-mode power-saving parameter after the terminal enters the idle mode.

The above-mentioned device further has the following characteristics:

the power-saving execution module is configured to: execute the power-saving operation in a sleep time interval of the idle-mode power-saving parameter, receive a paging message of the network side in an active window time interval of the sleep time interval and not receive the paging message of the network side in a dormant time interval of the sleep time interval after the terminal enters the idle mode.

The above-mentioned device further has the following characteristics:

the terminal power-saving device further comprises a reference power-saving parameter sending module, configured to send a power-saving indication or a reference terminal activity time parameter to the network side according to a static configuration of the terminal and/or an operator policy.

In order to solve the above-mentioned technical problem, the present document further provides a network-side power-saving device, comprising a power-saving parameter determining module and a power-saving parameter sending module; wherein, the power-saving parameter determining module is configured to: determine an idle-mode power-saving parameter of a terminal; and the power-saving parameter sending module is configured to: send the idle-mode power-saving parameter to the terminal.

The above-mentioned device further has the following characteristics:

the network-side power-saving device further comprises a reference power-saving parameter receiving module;

the reference power-saving parameter receiving module is configured to: receive at least one of a subscribed terminal activity time parameter, a reference terminal activity time parameter of a network element of a user plane, a reference terminal activity time parameter of a terminal side; and the power-saving parameter determining module is configured to: determine the terminal activity time parameter in the idle-mode power-saving parameter of the terminal according to at least one of the subscribed terminal activity time parameter, the reference terminal activity time parameter of the network element of the user plane, the reference terminal activity time parameter of the terminal side, and the operator policy; the activity time parameter comprises an active window time interval and a dormant time interval, an operation in the active window time interval is corresponding to an operation of receiving a paging message of the network side by the terminal in the idle mode, and an operation in the dormant time interval is corresponding to an operation of not receiving the paging message of the network side by the terminal in the idle mode.

The above-mentioned device further has the following characteristics:

the power-saving parameter determining module is further configured to: determine a long periodicity Tracking Area Update (TAU) time parameter in the idle-mode power-saving parameter, and a value of the long periodicity Tracking Area Update time parameter is greater than a value of a normal periodicity Tracking Area Update time parameter.

The above-mentioned device further has the following characteristics:

the power-saving parameter determining module is further configured to: determine a connection mode power-saving parameter of the terminal, and the connection mode power-saving parameter comprises a long discontinuous reception parameter, and a value of a data transceiving turn-off time in the long discontinuous reception parameter is greater than a value of a data transceiving turn-off time in a normal discontinuous reception parameter.

The above-mentioned device further has the following characteristics:

the network-side power-saving device further comprises a power-saving execution module; and the power-saving execution module is configured to: when a network element of the network side to which the power-saving execution module belongs is a mobility management network element, not perform a downlink paging directing at the terminal in the dormant time interval of the terminal; when a network element of the network side to which the power-saving execution module belongs is a network element of a user plane at the network side, not send a downlink data packet directing at the terminal in the dormant time interval of the terminal; and when a network element of the network side to which the power-saving execution module belongs is a machine type communication interworking function network element, not perform a downlink terminal activation request directing at the terminal in the dormant time interval of the terminal.

In order to solve the above-mentioned technical problem, the present document further provides a terminal power-saving method, comprising: a mobility management network element of a network side notifying a terminal activity time parameter of a terminal to a machine type communication interworking function network element (MTC IWF) of a network side or a network element of a user plane of the network side, wherein, the activity time parameter comprises an active window time interval and a dormant time interval; and the MTC IWF or the network element of the user plane of the network side not sending downlink signaling or downlink data to the terminal in the dormant time interval of the terminal.

The above-mentioned method further has the following characteristics:

the mobility management network element of the network side directly notifies a terminal activity time parameter of the terminal to the MTC IWF through a T5 interface.

The above-mentioned method further has the following characteristics:

the mobility management network element of the network side notifies the terminal activity time parameter of the terminal to a Home Subscriber server, the Home Subscriber server stores the terminal activity time parameter in subscription data or terminal context information, and the mobility management network element of the network side notifies the stored terminal activity time parameter of the terminal to the MTC IWF when receiving terminal routing inquiry information of the MTC IWF directing at the terminal.

The above-mentioned method further has the following characteristics:

the mobility management network element of the network side carries the terminal activity time parameter of the terminal in a refusal message sent to the network element of the user plane of the network side after receiving a downlink data notification message sent by the network element of the user plane of the network side.

Through the present document, when the terminal accessing the 3GPP network has a power-saving requirement, the network element of the 3GPP network side finally determines the power-saving parameter, such as, the terminal activity time parameter and long TAU time, long DRX parameter, etc., for the terminal according to the operator policy and the reference power-saving parameter. Under the connection mode, the terminal can perform the much optimized power-saving control through the long DRX parameter; under the idle mode, the terminal can receive the paging message in the active window time interval, and close the wireless transceiver system in the dormant time interval, which reduces the current consumption of the terminal greatly and achieves the purpose of power-saving. Meanwhile, if there is downlink data service, the terminal can also be triggered to receive the downlink data through paging the terminal in the activity time interval, so the user experience is not reduced.

In addition, after the network side obtains the terminal activity time parameter, it can further notify the MTC IWF and the network element of the user plane GGSN/PGW, to ensure not to accept any downlink data or downlink activation outside the activity time window, try to lighten the load pressure of the network and save the resources of the network. Every optimization power-saving procedure of the present document makes the terminal obviously achieve the power-saving effect.

PREFERRED EMBODIMENTS OF THE INVENTION

The present document is described in detail with reference to the accompanying drawings and in combination with embodiments hereinafter. It should be illustrated that, in the case of not conflicting, the embodiments in the present application and features in these embodiments can be combined with each other.

It needs to be pointed that the steps shown in the flow chart of the accompanying drawings can be executed in the computer system, such as a group of computer executable instructions, and, although the logic sequence is shown in the flow chart, the shown or described steps can be executed with orders different from here in some cases.

The scheme of the present document is mainly for solving the power-saving optimization control problem of the terminal by the network side, so as to optimize the power-saving result of the terminal, and not generate an obvious influence on the terminal service at the same time.

Figure 1:
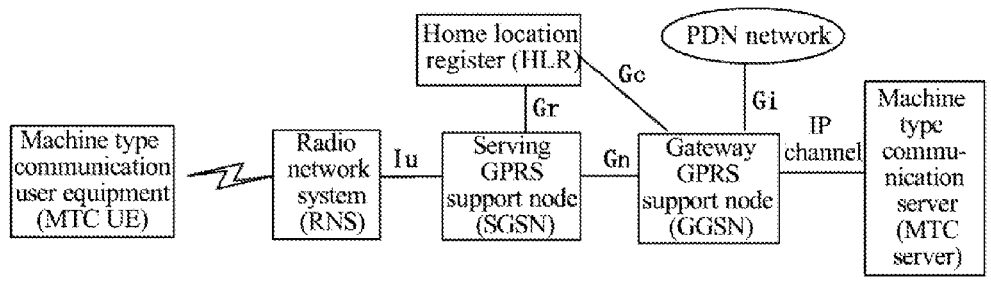
FIG. 1 is a system framework diagram of the GPRS network in the related art.
Figure 2:
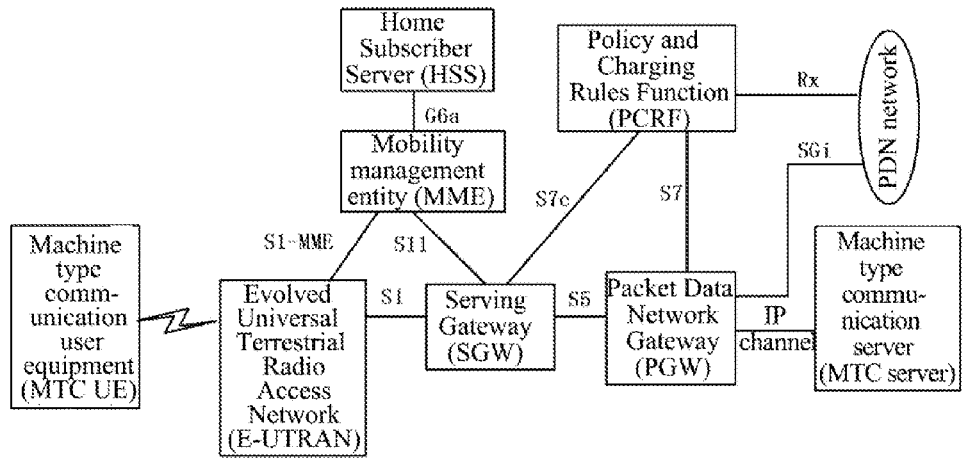
FIG. 2 is a system framework diagram of the EPS network in the related art.
Figure 3:
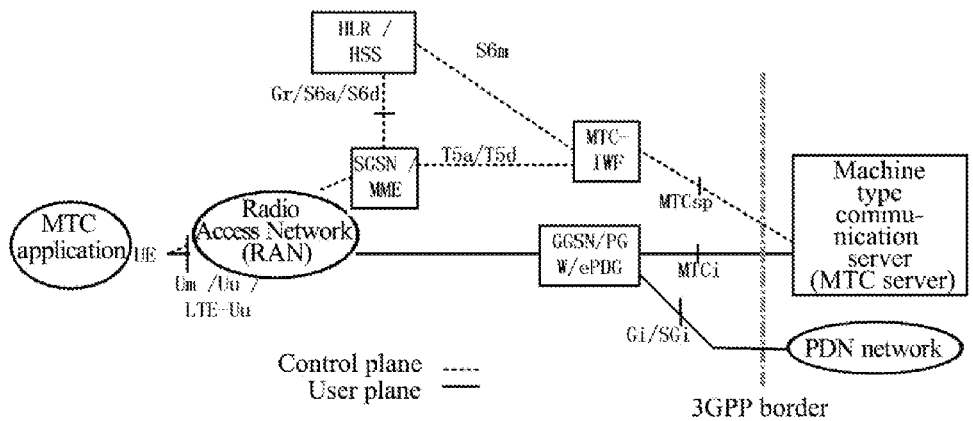
FIG. 3 is a system framework diagram of the evolved PS network to meet the M2M requirement.
Figure 4:
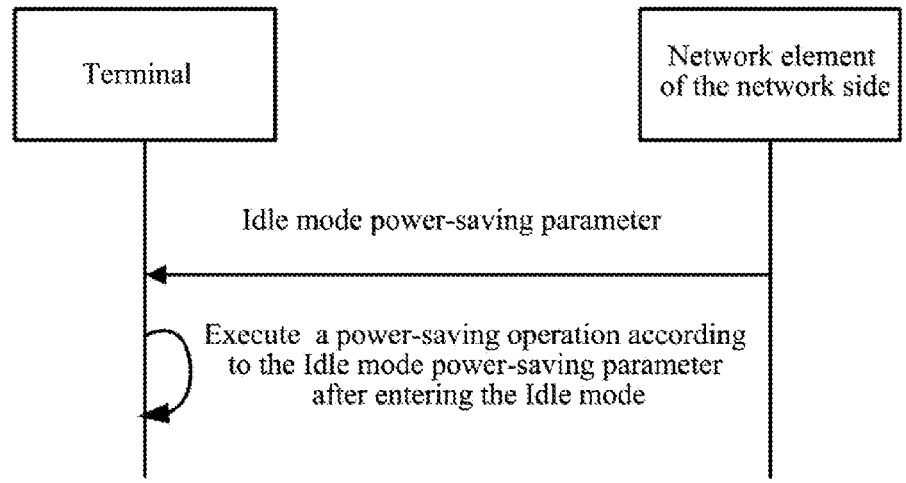
FIG. 4 is a diagram of a terminal power-saving method of an embodiment.

As shown in FIG. 4, a terminal power-saving method includes: a terminal accessing a network, a network element of a network side determining an idle-mode power-saving parameter of the terminal and notifying the idle-mode power-saving parameter to the terminal, and the terminal executing a power-saving operation according to the idle-mode power-saving parameter after the terminal enters an idle mode.

The idle-mode power-saving parameter includes a terminal activity time parameter, the activity time parameter comprises an active window time interval and a dormant time interval, and the terminal receives a paging message of the network side in the active window time interval and does not receive the paging message of the network side in the dormant time interval after entering the idle mode.

The terminal activity time parameter includes a sleep time interval parameter, the sleep time interval comprises one or more the active window time intervals and the dormant time intervals, and the terminal executes the power-saving operation in the sleep time interval after entering the idle mode; a default value of the sleep time interval is a long periodicity Tracking Area Update (TAU) time parameter or a normal periodicity Tracking Area Update time parameter. A value of the long periodicity TAU parameter is greater than a value of a normal periodicity Tracking Area Update time parameter (the value of the normal periodicity TAU parameter refers to a value defined in an existing standard or a value generally used in the specific communication system application), in this way, the time interval that the terminal enters the connected mode is extended greatly, which helps the terminal to save the power.

When the value of the sleep time interval is defaulted to the value of the periodicity TAU, there is no need to carry the value of the sleep time interval in the terminal activity time parameter. When the value of the sleep time interval is other values, it needs to carry the value of the sleep time interval in the terminal activity time parameter.

The idle-mode power-saving parameter further includes a long periodicity Tracking Area Update (TAU) time parameter, and a value of the long periodicity TAU parameter is greater than a value of a normal periodicity Tracking Area Update time parameter.

The network element of the network side further determines a connection mode power-saving parameter of the terminal and notifies the connection mode power-saving parameter to the terminal, the connection mode power-saving parameter comprises a long discontinuous reception parameter, and a value of a data transceiving turn-off time in the long discontinuous reception parameter is greater than a value of a data transceiving turn-off time in a normal discontinuous reception parameter (the value of the normal discontinuous reception parameter refers to a value defined in an existing standard or a value generally used in the specific communication system application), in this way, the non-working time of the terminal can be much longer, which helps the power-saving.

The network element of the network side determines that the terminal is a power-saving terminal according to a power-saving indication sent by the terminal, or, the network element of the network side determines that the terminal is a power-saving terminal according to an international mobile subscriber identification number (IMSI) indication of the terminal or an access point name (APN). Therefore it is convenient to determine that the terminal is the terminal requiring power-saving, thus make the power-saving policy for the terminal and perform the power-saving control.

When the network element of the network side is a mobility management network element of the network side (SGSN/MME), the terminal activity time parameter of the terminal is determined according to at least one of a subscribed terminal activity time parameter, a reference terminal activity time parameter of a network element of a user plane, a reference terminal activity time parameter of a terminal side, and an operator policy.

When the network element of the network side is a network element of a user plane at the network side (GGSN/PGW), the terminal activity time parameter of the terminal is determined according to at least one of a reference terminal activity time parameter of a network element of the user plane, a reference terminal activity time parameter of a terminal side, and an operator policy.

The mobility management network element of the network side (SGSN/MME) determines a value used for the long periodicity Tracking Area Update time parameter in the idle mode and a value used for the long discontinuous reception parameter in the connection mode for the power-saving terminal according to an operator policy.

The mobility management network element of the network side (SGSN/MME) does not perform a downlink paging directing at the terminal in the dormant time interval of the terminal; and a network element of a user plane at a network side (GGSN/PGW) does not send a downlink data packet directing at the terminal in the dormant time interval of the terminal.

The terminal power-saving device in the present scheme includes: a power-saving parameter receiving module and a power-saving execution module; wherein, the power-saving parameter receiving module is configured to: receive an idle-mode power-saving parameter from a network side; and the power-saving execution module is configured to: execute a power-saving operation according to the idle-mode power-saving parameter after the terminal enters an idle mode.

The power-saving execution module is configured to: receive a paging message of the network side in an active window time interval of the idle-mode power-saving parameter and not receive the paging message of the network side in a dormant time interval of the idle-mode power-saving parameter after the terminal enters the idle mode.

The power-saving execution module is configured to: execute the power-saving operation in a sleep time interval of the idle-mode power-saving parameter, receive a paging message of the network side in an active window time interval of the sleep time interval and not receive the paging message of the network side in a dormant time interval of the sleep time interval after the terminal enters the idle mode.

The terminal power-saving device further includes a reference power-saving parameter sending module, configured to send a power-saving indication or a reference terminal activity time parameter to the network side according to a static configuration of the terminal and/or an operator policy.

The network-side power-saving device in the present scheme includes a power-saving parameter determining module and a power-saving parameter sending module; wherein, the power-saving parameter determining module is configured to: determine an idle-mode power-saving parameter of a terminal; and the power-saving parameter sending module is configured to: send the idle-mode power-saving parameter to the terminal.

The network-side power-saving device further comprises a reference power-saving parameter receiving module;

the reference power-saving parameter receiving module is configured to: receive at least one of a subscribed terminal activity time parameter, a reference terminal activity time parameter of a network element of a user plane, a reference terminal activity time parameter of a terminal side; and the power-saving parameter determining module is configured to: determine the terminal activity time parameter in the idle-mode power-saving parameter of the terminal according to at least one of the subscribed terminal activity time parameter, the reference terminal activity time parameter of the network element of the user plane, the reference terminal activity time parameter of the terminal side, and the operator policy; the activity time parameter comprises an active window time interval and a dormant time interval, an operation in the active window time interval is corresponding to an operation of receiving a paging message of the network side by the terminal in the idle mode, and an operation in the dormant time interval is corresponding to an operation of not receiving the paging message of the network side by the terminal in the idle mode.

The power-saving parameter determining module is further configured to: determine a long periodicity Tracking Area Update (TAU) time parameter in the idle-mode power-saving parameter, and a value of the long periodicity Tracking Area Update time parameter is greater than a value of a normal periodicity Tracking Area Update time parameter.

The power-saving parameter determining module is further configured to: determine a connection mode power-saving parameter of the terminal, and the connection mode power-saving parameter comprises a long discontinuous reception parameter, and a value of a data transceiving turn-off time in the long discontinuous reception parameter is greater than a value of a data transceiving turn-off time in a normal discontinuous reception parameter.

The network-side power-saving device further comprises a power-saving execution module; and the power-saving execution module is configured to: when the network element of the network side to which the power-saving module belongs is a mobility management network element, not perform a downlink paging directing at the terminal in the dormant time interval of the terminal; when a network element of the network side to which the power-saving module belongs is a network element of a user plane at the network side, not send a downlink data packet directing at the terminal in the dormant time interval of the terminal; and when a network element of the network side to which the power-saving module belongs is a machine type communication interworking function network element, not perform a downlink terminal activation request directing at the terminal in the dormant time interval of the terminal.

It is described in detail through the embodiments hereinafter.

The Embodiment One

Figure 5:
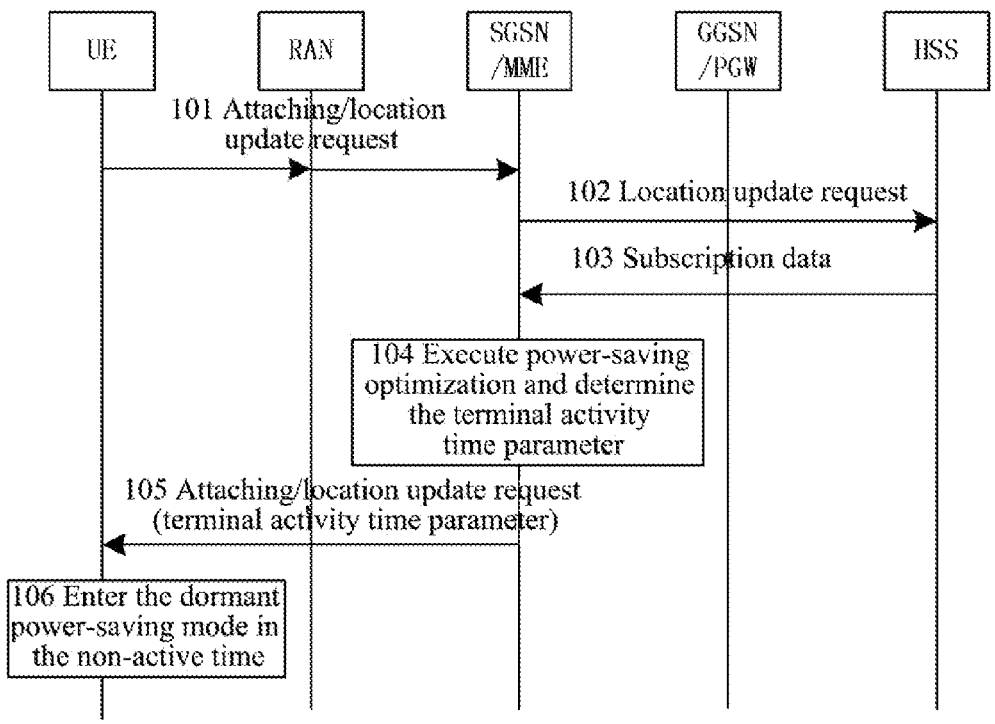
FIG. 5 to FIG. 11 are flow charts of embodiment one to seven for the GPP network side to perform the power-saving parameter decision respectively.

FIG. 5 is the flow chart of the embodiment one, the terminal is a terminal with power-saving requirement, and when the terminal normally requests to access the network, the mobility management network element of the network side (SGSN/MME) can identify that the terminal needs to perform the power-saving according to the accessed IMSI identification or according to the particular APN in the subscription. The SGSN/MME determines a terminal activity time parameter for the terminal according to the policy of the operator, and can make a power-saving policy at the same time, for example, making a long periodicity Tracking Area Update time parameter for the terminal with power-saving requirement, adjusting the DRX parameter used under the connected mode as the long DRX parameter, etc. After the relevant power-saving parameter is made by the SGSN/MME, it needs to be notified to the terminal in time, and the terminal executes a power-saving operation according to the power-saving parameter. It includes steps 101-106 as follows specifically.

In step 101: the 3GPP terminal initiates an attaching or location update request to a RAN access network of the 3GPP network, and the RAN selects a serving SGSN/MME and sends the request to the SGSN/MME.

In step 102: the SGSN/MME sends the location update request to the HSS, and the HSS identifies that the terminal is a non-limited terminal according to the IMSI identification and searches for the subscription data of the terminal.

In step 103: the HSS sends the subscription information of the terminal to the SGSN/MME, and the SGSN/MME performs the access authentication to the terminal.

In step 104: the SGSN/MME identifies that the terminal needs to perform power-saving according to the accessed IMSI identification (in the IMSI plan, a dedicated IMSI identification section can be planned for power-saving terminal) or according to the particular APN (the APN particularly used for power-saving) in the subscription. The SGSN/MME determines a terminal activity time parameter for the terminal according to the policy of the operator, and can make a power-saving policy at the same time, for example, making a long periodicity Tracking Area Update time parameter for the terminal with power-saving requirement, adjusting the DRX parameter used under the connected mode as the long DRX parameter, etc.

The time interval of the long periodicity Tracking Area Update time parameter is longer than the time interval of the normal periodicity Tracking Area Update time parameter, in this way, the time interval that the terminal enters the connected mode is extended greatly, which helps the terminal to save the power.

The value of the data transceiving turn-off time in the long discontinuous reception parameter is greater than the value of the data transceiving turn-off time in the normal discontinuous reception parameter; in this way, the non-working time of the terminal can be much longer, which helps the power-saving.

In step 105: after the SGSN/MME makes the relevant power-saving parameter, the above-mentioned power-saving parameter is carried in the access request response message and notified to the terminal in time; the terminal executes the power-saving operation according to the power-saving parameter, and the power-saving parameter includes at least the terminal activity time parameter, and can also include the long TAU time parameter, the long DRX parameter, etc.

In step 106: the terminal activity time parameter can include a sleep time, and one or more active window time intervals (called the activity time interval, same hereinafter) and dormant time intervals (the time side outside of the activity time interval of the sleep time is called the dormant time interval) in the sleep time interval. If the sleep time is defaulted as the TAU time, it may not be included in the terminal activity time parameter, and the default sleep time of the system is the TAU time.

The terminal activity time parameter should include at least one or more active window intervals and dormant time intervals. The terminal can receive the paging message in the active window time interval, and is unable to receive the wireless signal and cannot receive the paging message in the dormant time interval.

The terminal can realize the power-saving control according to the adjusted long DRX parameter in the Connected mode. It receives and sends the IP data packet in the DRX on period, and stops receiving and sending the IP data packet in the DRX off period. Compared with the normal DRX parameter, the DRX on time of the power-saving DRX parameter is shorter, and the DRX off time is longer.

The terminal adopts the terminal activity time parameter to perform the power-saving control when entering the Idle mode, and turns on the wireless system to receive the Paging message in the activity time interval; if there is the Paging message, the terminal reenters the Connected mode. The terminal closes the wireless system in the dormant time interval and does not receive the Paging message. In order to avoid the problem that the terminal paging service cannot be realized due to the time is too long in the sleep time, multiple activity time intervals can be defined in the long sleep time interval and evenly distributed in the sleep time interval. The long sleep time needs to be less than or equal to the long TAU time interval at the same time so as to prevent the SGSN/MME from performing the implicit Detach operation to the terminal because the terminal does not initiate the periodic Tracking Area Update in time.

The Embodiment Two

Figure 6:
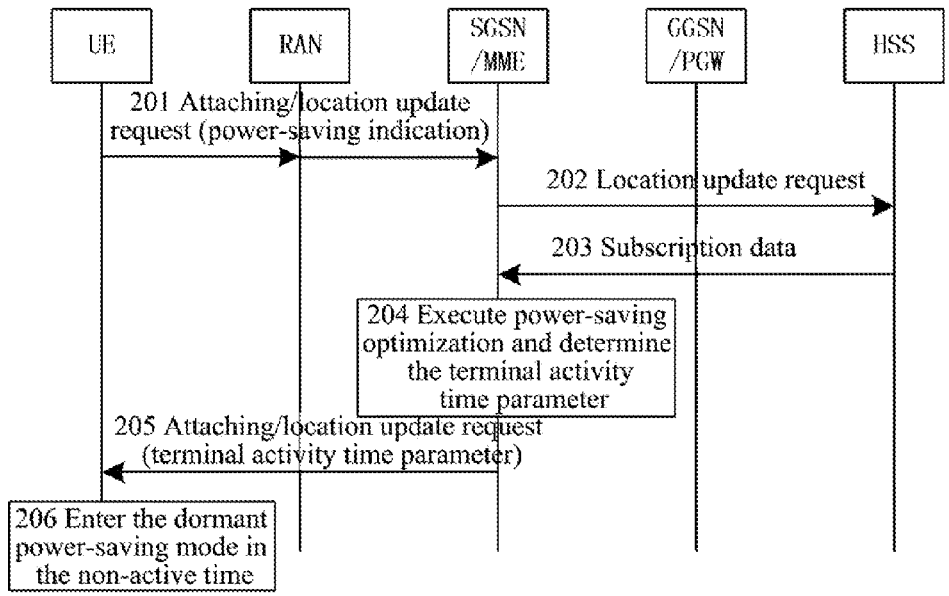

FIG. 6 is the flow chart of the embodiment two, the terminal is a terminal with power-saving requirement, and when the terminal requests to access the network, a power-saving indication is carried in the request message to the network side, to notify the network side that the terminal is a power-saving terminal. The mobility management network element of the network side (SGSN/MME) identifies that the terminal needs to perform power-saving according to the power-saving indication. The SGSN/MME determines a terminal activity time parameter for the terminal according to the policy of the operator, and can make a power-saving policy at the same time, for example, making a long periodicity Tracking Area Update time parameter for the terminal with power-saving requirement, adjusting the DRX parameter used under the connected mode as the long DRX parameter, etc. After made by the SGSN/MME, the relevant power-saving parameter needs to be notified to the terminal in time, and the terminal executes a power-saving operation according to the power-saving parameter. It includes steps 201-206 specifically.

In step 201: the 3GPP terminal initiates an attaching or location update request carrying a power-saving indication to a RAN access network of the 3GPP network, and the RAN selects a serving SGSN/MME and sends the access request carrying the power-saving indication to the SGSN/MME.

The terminal has two kinds, the active terminal and the passive terminal; whether the passive terminal needs the network to perform power-saving optimization can be regarded as a characteristic of the terminal and statically configured on the terminal, and the terminal can carry the power-saving indication when accessing.

In step 202: the SGSN/MME sends the location update request to the HSS, and the HSS identifies that the terminal is a non-limited terminal according to the IMSI identification and searches for the subscription data of the terminal.

In step 203: the HSS sends the subscription information of the terminal to the SGSN/MME, and the SGSN/MME performs the access authentication to the terminal.

In step 204: the SGSN/MME identifies whether the terminal needs to perform power-saving according to the power-saving indication. The SGSN/MME determines a terminal activity time parameter for the terminal according to the policy of the operator, and can make a power-saving policy at the same time, for example, making a long periodicity Tracking Area Update time parameter for the terminal with power-saving requirement, adjusting the DRX parameter used under the connected mode as the long DRX parameter, etc.

In step 205: after the SGSN/MME makes the relevant power-saving parameter, the above-mentioned power-saving parameter is carried in the access request response message and notified to the terminal in time; the terminal executes a power-saving operation according to the power-saving parameter, and the power-saving parameter includes at least the terminal activity time parameter, and can also include the long TAU time parameter, the long DRX parameter, etc.

In step 206: the terminal performs the power-saving operation after receiving the power-saving parameter, and the specific scheme of the power-saving operation refers to the related description in step 106.

The Embodiment Three

Figure 7:
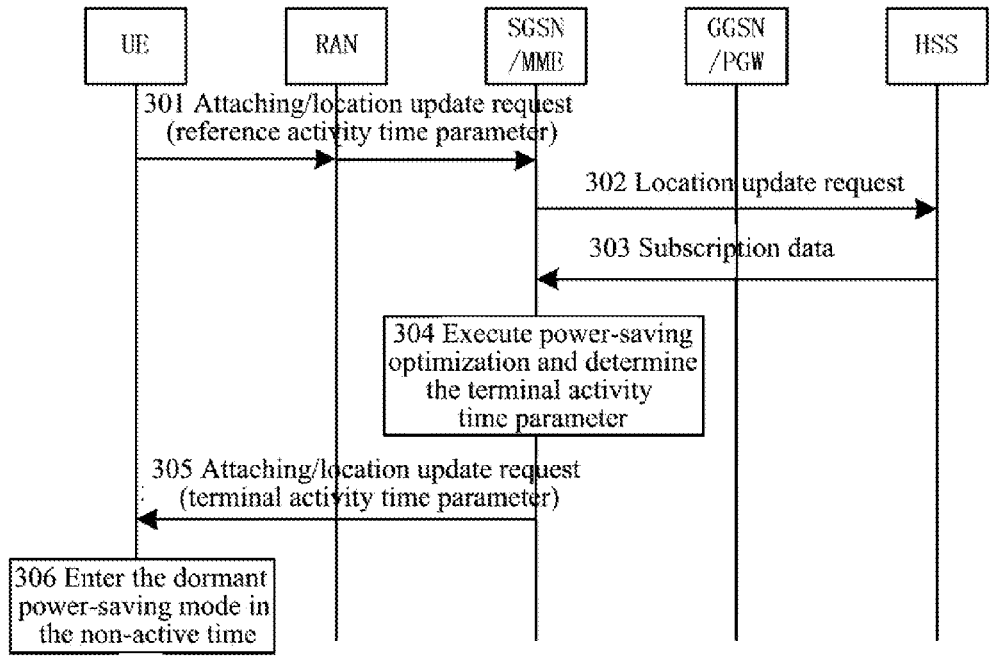

FIG. 7 is the flow chart of the embodiment three, the terminal is a terminal with power-saving requirement, and when the terminal requests to access the network, a reference terminal activity time parameter is carried in the request message to the network side, to notify the network side that the terminal needs to define a sleep time interval for power-saving. The mobility management network element of the network side (SGSN/MME) determines a terminal activity time parameter for the terminal according to the reference terminal activity time parameter and the policy of the operator, and can make a power-saving policy at the same time, for example, making a long periodicity Tracking Area Update time parameter for the terminal with power-saving requirement, adjusting the DRX parameter used under the connected mode as the long DRX parameter, etc. After made by the SGSN/MME, the relevant power-saving parameter needs to be notified to the terminal in time, and the terminal executes a power-saving operation according to the power-saving parameter. It includes steps 301-306 specifically.

In step 301: the 3GPP terminal initiates an attaching or location update request carrying a reference terminal activity time parameter to a RAN access network of the 3GPP network, and the RAN selects a serving SGSN/MME and sends the access request carrying the reference terminal activity time parameter to the SGSN/MME, to indicate the network side that the terminal needs to define a sleep time interval for power-saving.

In step 302: the SGSN/MME sends the location update request to the HSS, and the HSS identifies that the terminal is a non-limited terminal according to the IMSI identification and searches for the subscription data of the terminal.

In step 303: the HSS sends the subscription information of the terminal to the SGSN/MME, and the SGSN/MME performs the access authentication to the terminal.

In step 304: the SGSN/MME determines a terminal activity time parameter for the terminal according to the reference terminal activity time parameter and the policy of the operator, and can make a power-saving policy at the same time, for example, making a long periodicity Tracking Area Update time parameter for the terminal with power-saving requirement, adjusting the DRX parameter used under the connected mode as the long DRX parameter, etc.

In step 305: after the SGSN/MME makes the relevant power-saving parameter, the above-mentioned power-saving parameter is carried in the access request response message carries and notified to the terminal in time; the terminal executes a power-saving operation according to the power-saving parameter, and the power-saving parameter includes at least the terminal activity time parameter, and can also include the long TAU time parameter, the long DRX parameter, etc.

In step 306: the terminal performs the power-saving operation after receiving the power-saving parameter, and the specific scheme of the power-saving operation refers to the related description in step 106.

The Embodiment Four

Figure 8:
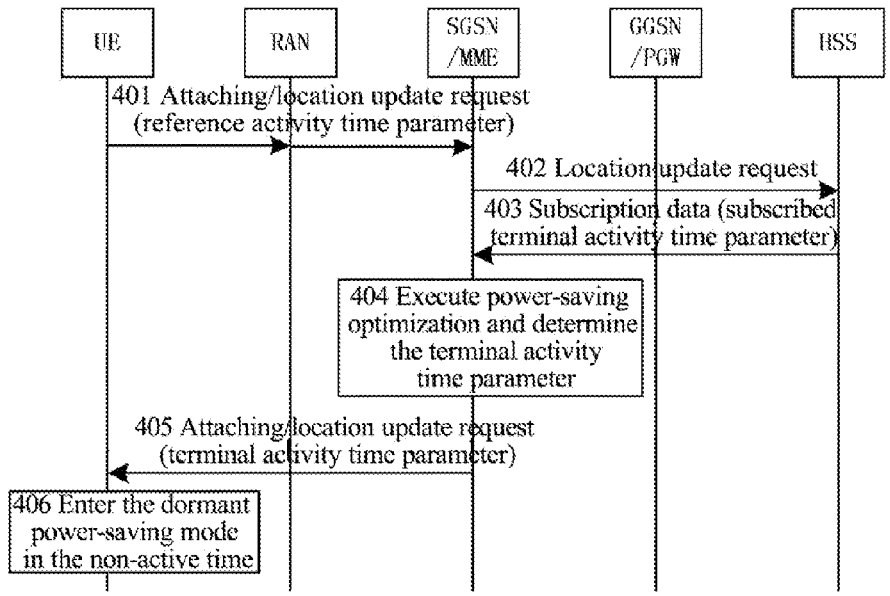

FIG. 8 is the flow chart of the embodiment four, the terminal is a terminal with power-saving requirement, and when the terminal requests to access the network, a reference terminal activity time parameter is carried in the request message to the network side, to notify the network side that the terminal needs to define a sleep time interval for power-saving, and a terminal activity time parameter is also subscribed in the subscription information of the HSS. The mobility management network element of the network side (SGSN/MME) determines a terminal activity time parameter for the terminal according to the reference terminal activity time parameter, the policy of the operator and the subscribed terminal activity time parameter, and can make a power-saving policy at the same time, for example, making a long periodicity Tracking Area Update time parameter for the terminal with power-saving requirement, adjusting the DRX parameter used under the connected mode as the long DRX parameter, etc. After made by the SGSN/MME, the relevant power-saving parameter needs to be notified to the terminal in time, and the terminal executes a power-saving operation according to the power-saving parameter. It includes steps 401-406 specifically.

In step 401: the 3GPP terminal initiates an attaching or location update request carrying a reference terminal activity time parameter to a RAN access network of the 3GPP network, and the RAN selects a serving SGSN/MME and sends the access request carrying the reference terminal activity time parameter to the SGSN/MME, to indicate the network side that the terminal needs to define a sleep time interval for power-saving.

In step 402: the SGSN/MME sends the location update request to the HSS, and the HSS identifies that the terminal is a non-limited terminal according to the IMSI identification and searches for the subscription data of the terminal. And the subscription information includes a subscribed terminal activity time parameter.

In step 403: the HSS sends the subscription information of the terminal to the SGSN/MME, and the SGSN/MME obtains the subscribed terminal activity time parameter from the subscription information and performs the access authentication to the terminal.

In step 404: the SGSN/MME determines a terminal activity time parameter for the terminal according to the reference terminal activity time parameter, the policy of the operator and the subscribed terminal activity time parameter, and can make a power-saving policy at the same time, for example, making a long periodicity Tracking Area Update time parameter for the terminal with the power-saving requirement, adjusting the DRX parameter used under the connected mode as the long DRX parameter, etc.

In step 405: after the SGSN/MME makes the relevant power-saving parameter, the above-mentioned power-saving parameter is carried in the access request response message and notified to the terminal in time; the terminal executes a power-saving operation according to the power-saving parameter, and the power-saving parameter includes at least the terminal activity time parameter, and can also include the long TAU time parameter, the long DRX parameter, etc.

In step 406: the terminal performs the power-saving operation after receiving the power-saving parameter, and the specific scheme of the power-saving operation refers to the related description in step 106.

The Embodiment Five

Figure 9:
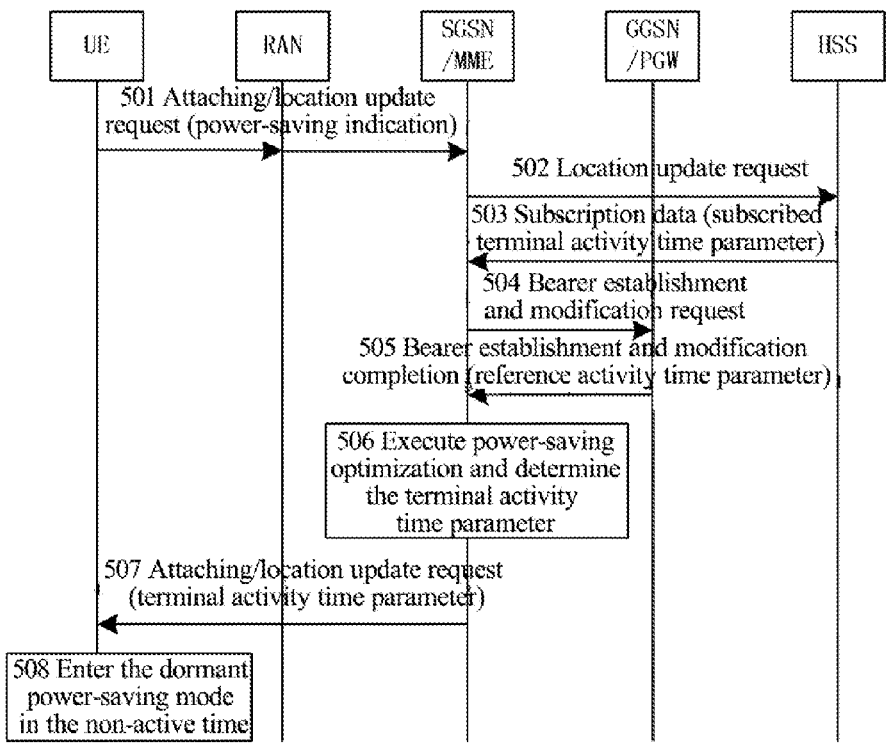

FIG. 9 is the flow chart of the embodiment five, the terminal is a terminal with power-saving requirement, and when the terminal requests to access the network, a power-saving indication is carried in the request message to the network side, to notify the network side that the terminal needs power-saving, and a terminal activity time parameter is also subscribed in the subscription information of the HSS. In addition, the network element of the user plane (GGSN/PGW) can also provide a reference terminal activity time parameter to the SGSN/MME. The mobility management network element of the network side (SGSN/MME) determines a terminal activity time parameter for the terminal according to the policy of the operator, the subscribed terminal activity time parameter and the reference terminal activity time parameter of the user plane, and can make a power-saving policy at the same time, for example, making a long periodicity Tracking Area Update time parameter for the terminal with power-saving requirement, adjusting the DRX parameter used under the connected mode as the long DRX parameter, etc. After made by the SGSN/MME, the relevant power-saving parameter needs to be notified to the terminal in time, and the terminal executes power-saving operation according to the power-saving parameter. It includes steps 501-508 specifically.

In step 501: the 3GPP terminal initiates an attaching or location update request carrying a power-saving indication to a RAN access network of the 3GPP network, and the RAN selects a serving SGSN/MME and sends the access request carrying the power-saving indication to the SGSN/MME, to indicate the network side that the terminal needs power-saving.

In step 502: the SGSN/MME sends the location update request to the HSS, and the HSS identifies that the terminal is a non-limited terminal according to the IMSI identification and searches for the subscription data of the terminal. And the subscription information includes a subscribed terminal activity time parameter.

In step 503: the HSS sends the subscription information of the terminal to the SGSN/MME, and the SGSN/MME obtains the subscribed terminal activity time parameter from the subscription information and performs the access authentication to the terminal.

In step 504: the SGSN/MME sends a bearer establishment or bearer modification request to the network element of the user plane (GGSN/PGW), to request to establish the user plane bearer for the terminal.

In step 505: the GGSN/PGW sends the reference terminal activity time parameter at the user plane side to the SGSN/MME in a bearer establishment or bearer modification response message.

The reference terminal activity time parameter at the user plane side can be carried in the PCC policy issued by the PCRF to the GGSN/PGW, and can also be a reference terminal activity time parameter determined based on the historical data monitored by the GGSN/PGW according to the flow rate of the bearer data packet of the user plane.

In step 506: the SGSN/MME determines a terminal activity time parameter for the terminal according to the policy of the operator, the subscribed terminal activity time parameter and the reference terminal activity time parameter of the user plane, and can make a power-saving policy at the same time, for example, making a long periodicity Tracking Area Update time parameter for the terminal with power-saving requirement, adjusting the DRX parameter used under the connected mode as the long DRX parameter, etc.

In step 507: after the SGSN/MME makes the relevant power-saving parameter, the above-mentioned power-saving parameter is carried in the access request response message and notified to the terminal in time; the terminal executes a power-saving operation according to the power-saving parameter, and the power-saving parameter includes at least the terminal activity time parameter, and can also include the long TAU time parameter, the long DRX parameter, etc.

In step 508: the terminal performs the power-saving operation after receiving the power-saving parameter, and the specific scheme of the power-saving operation refers to the related description in step 106.

The Embodiment Six

Figure 10:
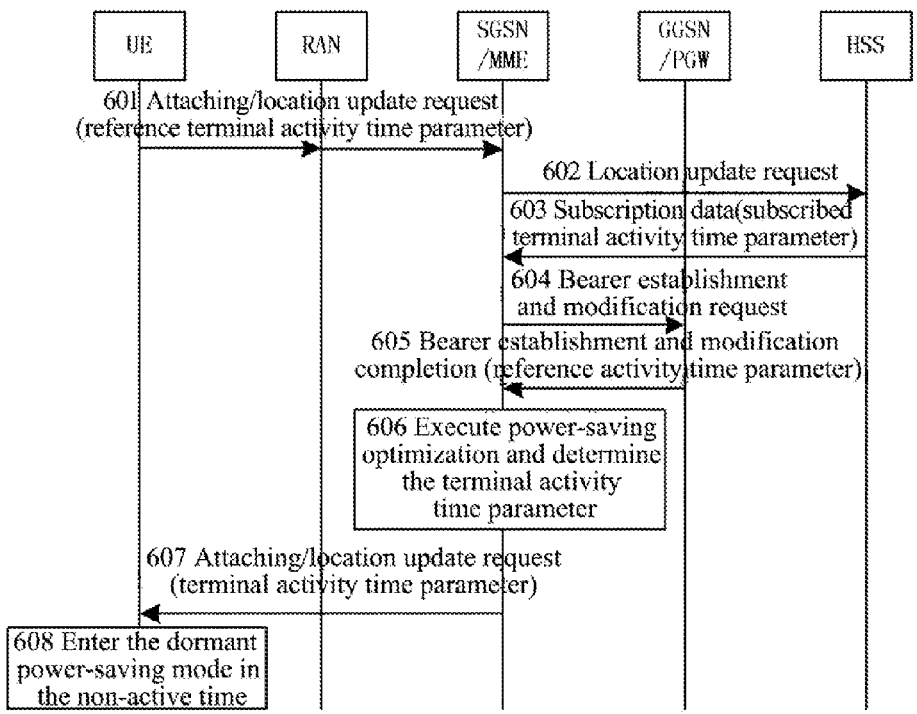

FIG. 10 is the flow chart of the embodiment six, the terminal is a terminal with power-saving requirement, and when the terminal requests to access the network, a reference terminal activity time parameter is carried in the request message to the network side, to notify the network side that the terminal needs to define a sleep time interval for power-saving, and a terminal activity time parameter is also subscribed in the subscription information of the HSS. In addition, the network element of the user plane (GGSN/PGW) can also provide a reference terminal activity time parameter to the SGSN/MME. The mobility management network element of the network side (SGSN/MME) determines a terminal activity time parameter for the terminal according to the reference terminal activity time parameter, the policy of the operator, the subscribed terminal activity time parameter and the reference terminal activity time parameter of the user plane, and can make a power-saving policy at the same time, for example, making a long periodicity Tracking Area Update time parameter for the terminal with power-saving requirement, adjusting the DRX parameter used under the connected mode as the long DRX parameter, etc. After made by the SGSN/MME, the relevant power-saving parameter needs to be notified to the terminal in time, and the terminal executes a power-saving operation according to the power-saving parameter. It includes steps 601-608 specifically.

In step 601: the 3GPP terminal initiates an attaching or location update request carrying a reference terminal activity time parameter to a RAN access network of the 3GPP network, and the RAN selects a serving SGSN/MME and sends the access request carrying the reference terminal activity time parameter to the SGSN/MME, to indicate the network side that the terminal needs to define a sleep time interval for power-saving.

In step 602: the SGSN/MME sends the location update request to the HSS, and the HSS identifies that the terminal is a non-limited terminal according to the IMSI identification and searches for the subscription data of the terminal. And the subscription information includes a subscribed terminal activity time parameter.

In step 603: the HSS sends the subscription information of the terminal to the SGSN/MME, and the SGSN/MME obtains the subscribed terminal activity time parameter from the subscription information and performs the access authentication to the terminal.

In step 604: the SGSN/MME sends a bearer establishment or bearer modification request to the network element of the user plane (GGSN/PGW), to request to establish the user plane bearer for the terminal.

In step 605: the GGSN/PGW sends the reference terminal activity time parameter at the user plane side to the SGSN/MME in a bearer establishment or bearer modification response message.

The reference terminal activity time parameter at the user plane side can be carried in the PCC policy issued by the PCRF to the GGSN/PGW, and can also be a reference terminal activity time parameter determined based on the historical data monitored by the GGSN/PGW according to the flow rate of the bearer data packet of the user plane.

In step 606: the SGSN/MME determines a terminal activity time parameter for the terminal according to the reference terminal activity time parameter, the policy of the operator, the subscribed terminal activity time parameter and the reference terminal activity time parameter of the user plane, and can make a power-saving policy at the same time, for example, making a long periodicity Tracking Area Update time parameter for the terminal with power-saving requirement, adjusting the DRX parameter used under the connected mode as the long DRX parameter, etc.

In step 607: after the SGSN/MME makes the relevant power-saving parameter, the above-mentioned power-saving parameter is carried in the access request response message and notified to the terminal in time; the terminal executes a power-saving operation according to the power-saving parameter, and the power-saving parameter includes at least the terminal activity time parameter, and also can include the long TAU time parameter, the long DRX parameter, etc.

In step 608: the terminal performs the power-saving operation after receiving the power-saving parameter, and the specific scheme of the power-saving operation refers to the related description in step 106.

The Embodiment Seven

Figure 11:
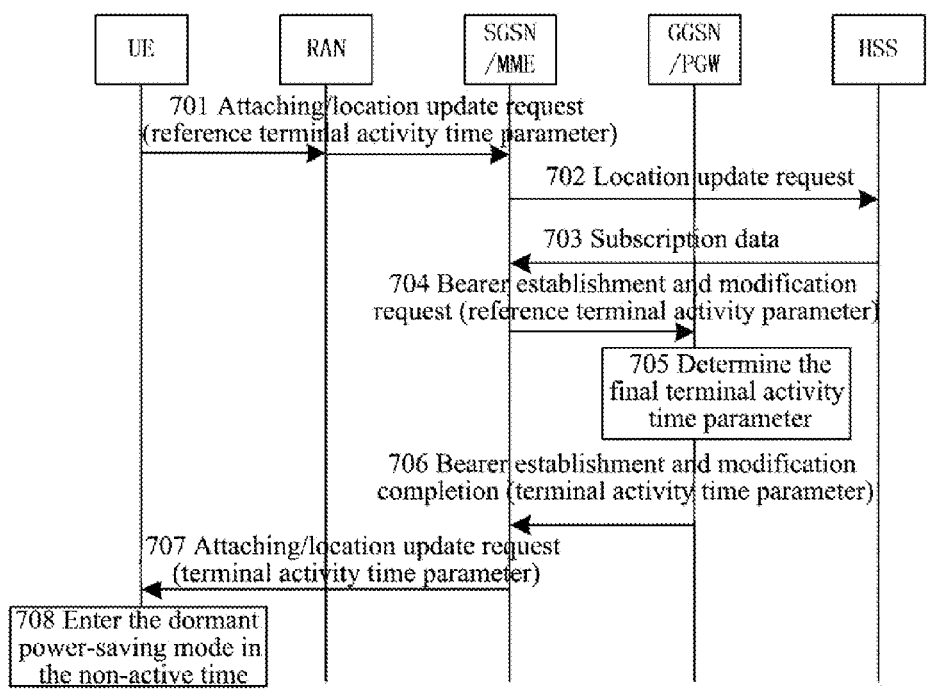

FIG. 11 is the flow chart of the embodiment seven, the terminal is a terminal with power-saving requirement, and when the terminal requests to access the network, a reference terminal activity time parameter is carried in the request message to the network side, to notify the network side that the terminal needs to define a sleep time interval for power-saving, and can also a power-saving indication be carried in the request message to the network side. The mobility management network element of the network side (SGSN/MME) determines a terminal activity time parameter for the terminal according to the reference terminal activity time parameter and the policy of the operator, and notifies the terminal activity time parameter to the terminal in time, and the terminal executes a power-saving operation according to the terminal activity time parameter. It includes steps 701-708 specifically.

In step 701: the 3GPP terminal initiates an attaching or location update request carrying a reference terminal activity time parameter or the power-saving indication to a RAN access network of the 3GPP network, and the reference terminal activity time parameter or the power-saving indication can also be carried in the PCO parameter; and the RAN selects a serving SGSN/MME and sends the access request carrying the reference terminal activity time parameter or the power-saving indication to the SGSN/MME, to indicate the network side that the terminal needs to define a sleep time interval for power-saving.

In step 702: the SGSN/MME sends the location update request to the HSS, and the HSS identifies that the terminal is a non-limited terminal according to the IMSI identification and searches for the subscription data of the terminal.

In step 703: the HSS sends the subscription information of the terminal to the SGSN/MME, and the SGSN/MME performs the access authentication to the terminal.

In step 704: the SGSN/MME sends a bearer establishment or bearer modification request to the network element of the user plane (GGSN/PGW), to request to establish the user plane bearer for the terminal. The request message includes the reference terminal activity time parameter or the power-saving indication, which can be put in the PCO parameter.

In step 705: the SGSN/MME determines a terminal activity time parameter for the terminal according to the reference terminal activity time parameter, the policy of the operator and the reference terminal activity time parameter of the user plane.

The reference terminal activity time parameter at the user plane side can be carried in the PCC policy issued by the PCRF to the GGSN/PGW, and a reference terminal activity time parameter can also be determined based on the historical data monitored by the GGSN/PGW according to the flow rate of the bearer data packet of the user plane.

In step 706: the GGSN/PGW sends the terminal activity time parameter in the bearer establishment or bearer modification response message to the SGSN/MME. The terminal activity time parameter can be included in the PCO parameter.

In step 707: the SGSN/MME carries the terminal activity time parameter in the access request response message to notify the terminal, and the terminal activity time parameter can be included in the PCO parameter; the terminal executes a power-saving operation according to the terminal activity time parameter.

In step 708: the terminal performs the power-saving operation after receiving the terminal activity time parameter, and the specific scheme of the power-saving operation refers to the related description in step 106. It should be pointed that, in order to avoid the SGSN/MME not knowing the sleep time of the terminal and the implicit Detach risk when the sleep time exceeds the TAU time, during making the actual time parameter, the TAU time can be defaulted as the sleep time of the terminal, and the GGSN/MME only needs to make the terminal activity time window interval.

After obtaining the terminal activity time parameter, the network element of the network side can adopts many modes to notify the MTC IWF or the network element of the user plane (GGSN/PGW), such as, notifying by adopting the T5 interface, or storing and inquiring by the HSS, or carrying the time parameter in the downlink data notification response message sent by the network element of the user plane. The MTC IWF will no longer receive the downlink signaling of the MTC Server in the dormant time interval of the terminal, such as the terminal activation request message, thus avoiding the resource consumption of the signaling plane resources in the network side; the network element of the user plane (GGSN/PGW) does not receive the sending of the downlink data packet again in the dormant time interval of the terminal, thus avoiding the resource consumption of the user plane resources in the network side.

The present scheme provides a terminal power-saving method controlled by the network side, including: a mobility management network element of a network side (SGSN/MME) notifies a terminal activity time parameter of a terminal to a machine type communication interworking function network element (MTC IWF) of a network side or a network element of a user plane of the network side, the activity time parameter comprises an active window time interval and a dormant time interval; and the MTC IWF or the network element of the user plane of the network side in the dormant time interval of the terminal does not perform sending of a downlink signaling or downlink data to the terminal.

It can adopt the following notification method:

the mobility management network element of the network side directly notifies a terminal activity time parameter of the terminal to the MTC IWF through a T5 interface;

the mobility management network element of the network side notifies the terminal activity time parameter of the terminal to a Home Subscriber server, the Home Subscriber server stores the terminal activity time parameter in subscription data or terminal context information, and notifies the stored terminal activity time parameter of the terminal to the MTC IWF when receiving terminal routing inquiry information of the MTC IWF regarding the terminal.

The mobility management network element of the network side carries the terminal activity time parameter of the terminal in a refusal message sent to the network element of the user plane of the network side after receiving a downlink data notification message sent by the network element of the user plane of the network side.

By adopting the above-mentioned energy-conserving method controlled by the network, the energy-conserving result optimized at the network side can be achieved, and the embodiments are as follows.

Embodiment Eight

Figure 12:
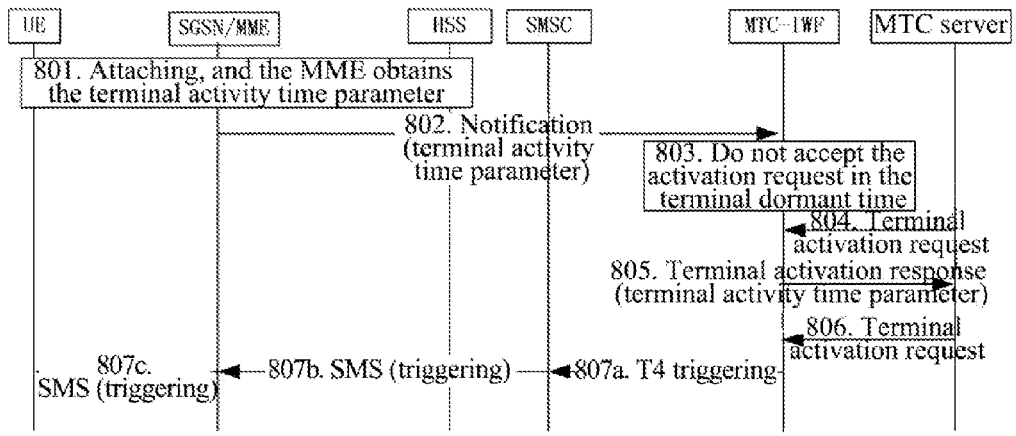
FIG. 12 to FIG. 16 are flow charts of embodiment eight to twelve for the GPP network side to perform the power-saving parameter notification respectively.

FIG. 12 is the flow chart of the embodiment eight, after the mobility management network element of the 3GPP network side (SGSN/MME) obtains the terminal activity time parameter, the SGSN/MME notifies the time parameter to the MTC IWF in time through the T5 interface with the MTC IWF, and the MTC IWF performs the corresponding power-saving policy. The specific steps include 801-807.

In step 801: the terminal requests to access the 3GPP network, and the SGSN/MME obtains the activity time parameter of the terminal after the terminal attaches to the network. The activity time parameter can both be notified to the SGSN/MME after determining by the terminal, and be notified to the terminal after determining by the network side.

In step 802: if the network side SGSN/MME already sets up the T5 interface connection with the MTC IWF, the MSC/SGSN notifies the terminal activity time parameter to the MTC IWF by adopting a particular signaling through the T5 interface.

In step 803: after the MTC IWF obtains the terminal activity time parameter, when receiving the downlink signaling from the MTC Server, such as the terminal activation request signaling, the MTC IWF judges whether it is in the activity time interval or in the dormant time interval now. If it is in the dormant time interval, the MTC IWF will refuse the downlink signaling request to avoid this signaling being sent to the network element of the core network which causes the consumption of the signaling and the user plane resources.

In step 804: after the MTC Server receives the downlink request of the application server, it initiates the terminal activation request to the network, to activate the terminal to perform the terminal paging service.

In step 805: if the terminal is in the dormancy state, the MTC IWF will refuse the activation request, and can carry the terminal activity time parameter in the activation request response message and send it to the MTC Server.

In step 806: the MTC Server can try to reinitiate the activation request to the MTC IWF after some time, or initiates the activation request in terminal active time interval.

In step 807: in the terminal active time interval, the MTC IWF encapsulates the activation request in the T4 interface and sends it to the SMSC through the T4 interface with the SMSC, and the SMSC encapsulates the activation request in the short message and sends it to the terminal through the short message mechanism.

Embodiment Nine

Figure 13:
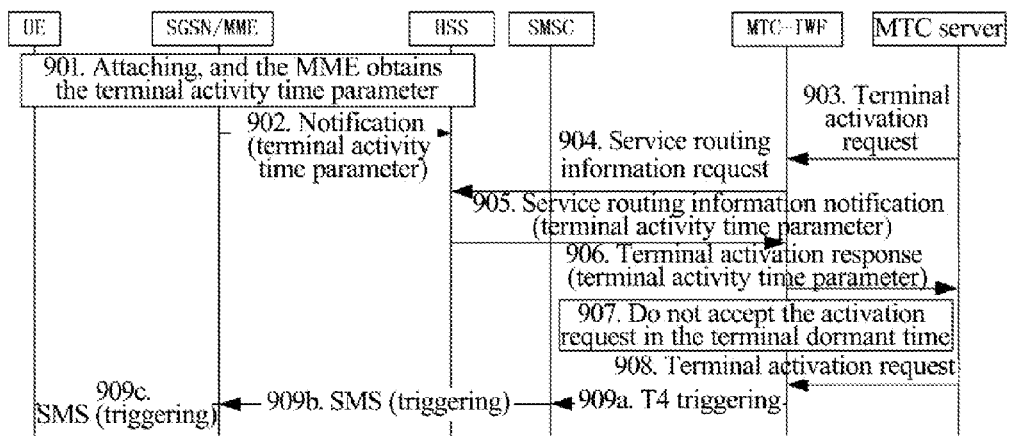

FIG. 13 is the flow chart of the embodiment nine, after the mobility management network element of the 3GPP network side (SGSN/MME) obtains the terminal activity time parameter, the SGSN/MME notifies the HSS to store it. When the MTC IWF initiates the service routing inquiry request to the HSS, the HSS carries the time parameter in the service routing inquiry response message to the MTC IWF, and the MTC IWF performs the corresponding power-saving policy. The specific steps include 901-909.

In step 901: the terminal requests to access the 3GPP network, and the SGSN/MME obtains the activity time parameter of the terminal after the terminal attaches to the network. The activity time parameter can both be notified to the SGSN/MME after determining by the terminal, and be notified to the terminal after determining by the network side.

In step 902: after the attachment of the terminal is complete, the network side SGSN/MME sends the notification message to the HSS to notify the terminal activity time parameter to the HSS, and the HSS stores the terminal activity time which can be stored in the subscription information of the terminal or the terminal context information.

In step 903: after the MTC Server receives the downlink request from the application server, it initiates a terminal activation request to the network, to activate the terminal to perform the terminal paging service.

In step 904: after receiving the activation request, the MTC IWF needs to inquire the address of the resident SGSN/MME of the terminal from the HSS according to the terminal identification in the activation request. The MTC IWF initiates the service routing inquiry request to the HSS.

In step 905: the HSS returns the service routing inquiry response message carrying the SGSN/MME address attached by the terminal to the MTC IWF, and notifies the terminal activity time parameter stored in the HSS to the MTC IWF at the same time.

In step 906: the MTC IWF judges whether the terminal is in the dormancy state; if the terminal is in the dormancy state, the MTC IWF will refuse the activation request, and can carry the terminal activity time parameter in the activation request response message and send it to the MTC Server.

In step 907: after the MTC IWF obtains the terminal activity time parameter, when continuously receiving the downlink signaling from the MTC Server, such as the terminal activation request signaling, the MTC IWF judges whether it is in the activity time interval or in the dormant time interval now. If it is in the dormant time interval, the MTC IWF will refuse the downlink signaling request to avoid this signaling being sent to the network element of the core network which causes the consumption of the signaling and the user plane resources.

In step 908: the MTC Server can try to reinitiate the activation request to the MTC IWF after some time, or initiates the activation request in terminal active time interval.

In step 909: in the terminal active time interval, the MTC IWF encapsulates the activation request in the T4 interface and sends it to the SMSC through the T4 interface with the SMSC, and the SMSC encapsulates the activation request in the short message and sends it to the terminal through the short message mechanism.

Embodiment Ten

Figure 14:
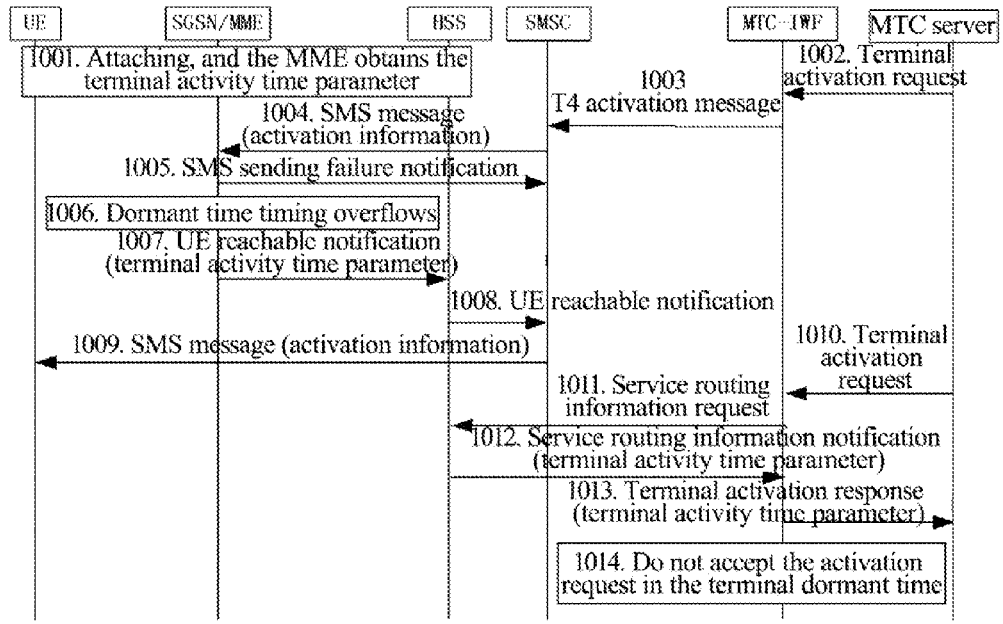

FIG. 14 is the flow chart of the embodiment ten, after the mobility management network element of the 3GPP network side (SGSN/MME) obtains the terminal activity time parameter, the SGSN/MME carries the time parameter in the UE reachable message to the HSS, and the HSS stores it. When the MTC IWF initiates a service routing inquiry request to the HSS, the HSS carries the time parameter in the service routing inquiry response message to the MTC IWF, and the MTC IWF performs the corresponding power-saving policy. The specific steps include 1001-1014.

In step 1001: the terminal requests to access the 3GPP network, and the SGSN/MME obtains the activity time parameter of the terminal after the terminal attaches to the network. The activity time parameter can both be notified to the SGSN/MME after determining by the terminal, and be notified to the terminal after determining by the network side.

In step 1002: after the MTC Server receives the downlink request of the application server, it initiates a terminal activation request to the network, to activate the terminal to perform the terminal paging service.

In step 1003: the MTC IWF sends the activation request to the SMSC through the T4 interface.

In step 1004: the SMSC performs the SMS mechanism, encapsulates the activation request in the SMS message and sends it to the SGSN/MME.

In step 1005: the SGSN/MME judges whether the terminal is in the dormancy state. If the terminal is in the dormancy state, the MTC IWF will abandon the SMS message, and return a notification of SMS message sending failure to the SMSC.

In step 1006: the terminal dormant time interval of the SGSN/MME is over, the dormancy timer overflows, and the SGSN/MME enters the activity time interval.

In step 1007: the SGSN/MME notifies the UE reachable message to the HSS, and the message carries the terminal activity time parameter to the HSS.

In step 1008: after the HSS receives the UE reachable message, it obtains the carried terminal activity time parameter for storage, which can be stored in the subscription information of the terminal or the terminal context information. Then the HSS sends the UE reachable message notification to the SMSC.

In step 1009, the SMSC sends the SMS message carrying the activation request information to the terminal.

In step 1010: after the MTC Server receives the downlink request of the application server again, if the terminal is already in the Idle mode, the MTC server needs to initiate a terminal activation request to the network, to activate the terminal to perform the terminal paging service.

In step 1011: after receiving the activation request again, the MTC IWF needs to inquire the address of the resident SGSN/MME of the terminal from the HSS according to the terminal identification in the activation request. The MTC IWF initiates the service routing inquiry request to the HSS.

In step 1012: the HSS returns the service routing inquiry response message carrying the SGSN/MME address attached by the terminal to the MTC IWF, and notifies the terminal activity time parameter stored in the HSS to the MTC IWF at the same time.

In step 1013: the MTC IWF judges whether the terminal is in the dormancy state; if the terminal is in the dormancy state, the MTC IWF will refuse the activation request, and can carry the terminal activity time parameter in the activation request response message and send it to the MTC Server.

In step 1014: after the MTC IWF obtains the terminal activity time parameter, when continuously receiving the downlink signaling from the MTC Server, such as the terminal activation request signaling, the MTC IWF judges whether it is in the activity time interval or in the dormant time interval now. If it is in the dormant time interval, the MTC IWF will refuse the downlink signaling request to avoid this signaling being sent to the network element of the core network which causes the consumption of the signaling and the user plane resources.

Embodiment Eleven

Figure 15:
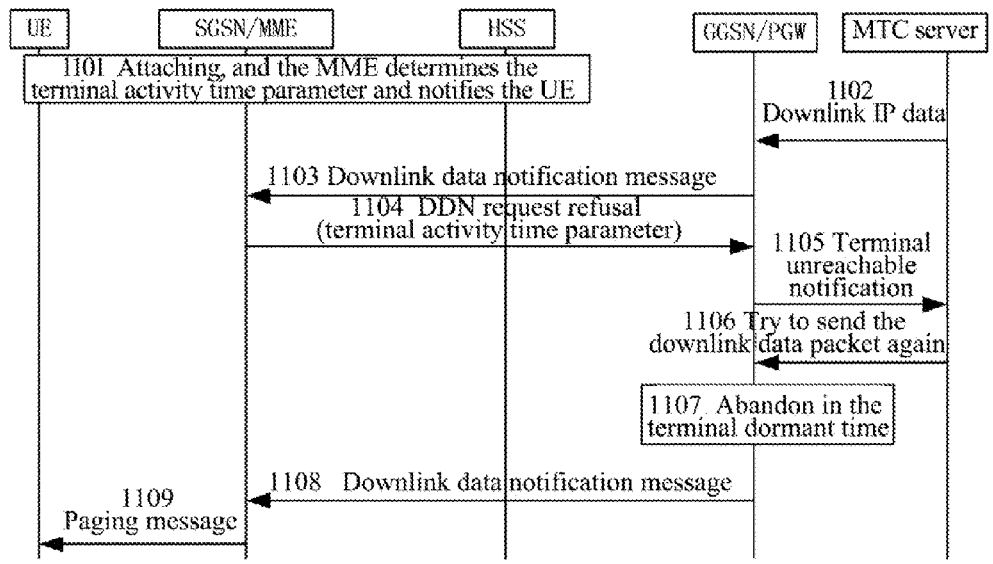

FIG. 15 is the flow chart of the embodiment eleven, after the mobility management network element of the 3GPP network side (SGSN/MME) obtains the terminal activity time parameter, the SGSN/MME notifies the network element of the user plane GGSN/PGW, and the GGSN/PGW performs the corresponding power-saving policy. The specific steps include 1101-1109.

In step 1101: the terminal requests to access the 3GPP network, and the SGSN/MME obtains the activity time parameter of the terminal after the terminal attaches to the network. The activity time parameter can both be notified to the SGSN/MME after determining by the terminal, and be notified to the terminal after determining by the network side.

In step 1102: after receiving the downlink data from the application server, the MTC Server forwards the downlink IP data packet of the terminal to the network element of the user plane GGSN/PGW, or the application server directly sends the downlink IP data packet of the terminal to the network element of the user plane GGSN/PGW.

In step 1103: because the terminal is in the Idle state, the network element of the user plane GGSN/PGW sends the downlink data notification (DDN) message to the SGSN/MME, to request to set up the user plane connection with the terminal.

In step 1104: the SGSN/MME judges whether the terminal is in the dormancy state; if the terminal is in the dormancy state, the MTC IWF will refuse the DDN message, and can carry the terminal activity time parameter and the reason value of the refusal—the terminal is dormant—in the refusal message.

In step 1105: the network element of the user plane GGSN/PGW knows that the terminal is in the dormancy state according to the terminal activity time parameter, and the GGSN/PGW returns a user unreachable message to the MTC Server or the application server.

In step 1106: after the MTC Server or the application server knows that the user is not reachable, it will delay for some time, and then tries to initiate the downlink IP data packet to the terminal again.

In step 1107: after receiving the downlink IP data packet, the GGSN/PGW judges whether the terminal is in the activity time interval or in the dormant time interval at this moment. If it is in the dormant time interval, the GGSN/PGW will refuse to initiate a DDN request to the SGSN/MME to avoid causing the consumption of the signaling and the user plane resources. It will return the user unreachable message again at the same time.

In step 1108: after the GGSN/PGW receives the downlink IP data packet, if the terminal is in the activity time interval, the GGSN/PGW will send a DDN notification message to the SGSN/MME.

In step 1109: the SGSN/MME judges that the terminal is in the activity time interval, and it will initiate a paging request to the terminal, and the terminal will set up the user plane connection with the GGSN/PGW voluntarily after receiving the paging message.

Embodiment Twelve

Figure 16:
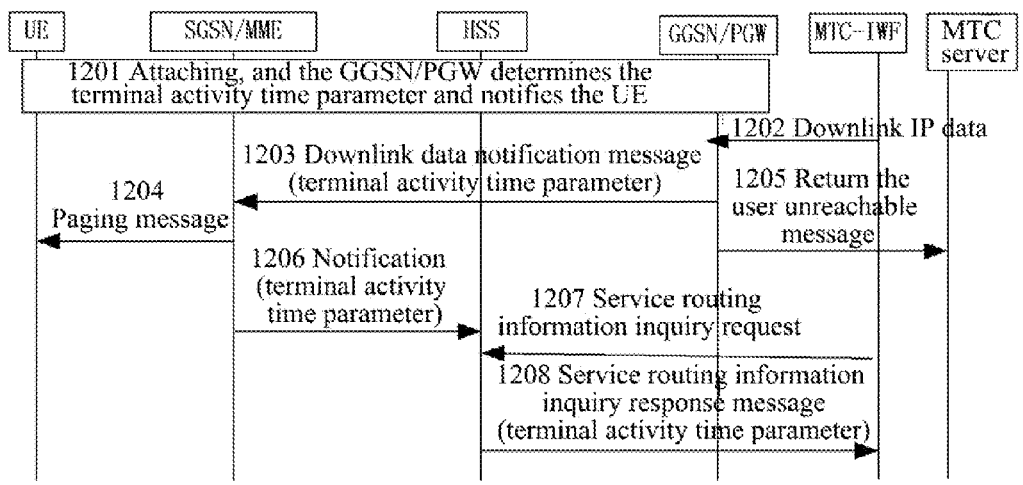

FIG. 16 is the flow chart of the embodiment twelve, after the terminal is attached to the 3GPP network, the network element of the user plane GGSN/PGW determines the terminal activity time parameter and sends it to the terminal. The GGSN/PGW notifies the terminal activity time parameter in the downlink data notification message to the SGSN/MME network element, and the SGSN/MME can further notify the terminal activity time parameter to the MTC IWF according to the schemes of the above-mentioned embodiments. The MTC IWF performs the corresponding power-saving policy. The specific steps include 1201-1208.

In step 1201: the terminal requests to access the 3GPP network, and sets up the user plane bearer after the terminal attaches to the network. The terminal activity time parameter is determined by the GGSN/PGW and sent to the terminal.

In step 1202: after receiving the downlink data from the application server, the MTC Server forwards the downlink IP data packet of the terminal to the network element of the user plane GGSN/PGW, or the application server directly sends the downlink IP data packet of the terminal to the network element of the user plane GGSN/PGW.

In step 1203: because the terminal is in the Idle state, the network element of the user plane GGSN/PGW judges that the terminal is in the active state for the SGSN/MME, and sends a downlink data notification (DDN) message to the SGSN/MME, to request to set up a user plane connection with the terminal. The terminal activity time parameter is carried in the downlink data notification message and sent to the SGSN/MME.

In step 1204: the SGSN/MME sends the paging message to the terminal, and the terminal will set up the user plane connection with the GGSN/PGW voluntarily after receiving the paging message.

In step 1205: the network element of the user plane GGSN/PGW knows that the terminal is in a dormancy state according to the terminal activity time parameter, and the GGSN/PGW returns a user unreachable message to the MTC Server or the application server.

In step 1206: the SGSN/MME can send the notification message to the HSS at the same time, to notify the terminal activity time parameter to the HSS, and the HSS stores the terminal activity time which can be stored in the subscription information of the terminal or the terminal context information.

In step 1207: after receiving the downlink request of the application server, the MTC Server will initiate a terminal activation request to the network, to activate the terminal to perform the terminal paging service.

After receiving the activation request again, the MTC IWF needs to inquire the address of the resident SGSN/MME of the terminal from the HSS according to the terminal identification in the activation request. The MTC IWF initiates a service routing inquiry request to the HSS.

In step 1208: the HSS returns a service routing inquiry response message carrying the SGSN/MME address attached by the terminal to the MTC IWF, and notifies the terminal activity time parameter stored in the HSS to the MTC IWF at the same time. The MTC IWF can perform the power-saving control according to the terminal activity time parameter.

Through the above-mentioned system of the embodiment of the present document, it can make the network side formulate the power-saving parameter for the terminal, and notify the power-saving parameter to the MTC IWF or the GGSN/PGW, which not only optimizes the power-saving result of the terminal, but also avoids consuming the unnecessary signaling plane and user plane resources of the network side and reaches better application effect.

It should be pointed that, in the case of not conflicting, the embodiments in the present application and features in these embodiments can be combined arbitrarily with each other.

Obviously, the present document can have a variety of other embodiments. Those skilled in the art can make the corresponding modifications and variations according to the present document without departing from the spirit and essence of the present document. And all of these modifications or the variations should be embodied in the scope of the appending claims of the present document.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

INDUSTRIAL APPLICABILITY

Through the present document, when the terminal accessing the 3GPP network has a power-saving requirement, the network element of the 3GPP network side finally determines the power-saving parameter, such as, the terminal activity time parameter and long TAU time, long DRX parameter, etc., for the terminal according to the operator policy and the reference power-saving parameter. Under the connection mode, the terminal can perform the much optimized power-saving control through the long DRX parameter; under the idle mode, the terminal can receive the paging message in the active window time interval, and close the wireless transceiver system in the dormant time interval, which reduces the current consumption of the terminal greatly and achieves the purpose of power-saving. Meanwhile, if there is downlink data service, the terminal is also can be triggered to receive the downlink data through paging the terminal in the activity time interval, so the user experience is not reduced.

What we claim is:

1. A terminal power-saving method, comprising:
   a terminal accessing a network, a network element of a network side determining an idle-mode power-saving parameter of the terminal and notifying the idle-mode power-saving parameter to the terminal, and the terminal executing a power-saving operation according to the idle-mode power-saving parameter after the terminal enters an idle mode;
   wherein the idle-mode power-saving parameter comprises a terminal activity time parameter, the terminal activity time parameter comprises a sleep time interval parameter, the sleep time interval comprises one or more active window time intervals and dormant time intervals, and the terminal executes the power-saving operation in the sleep time interval after entering the idle mode;
   wherein a value of the sleep time interval is same with a value of a long periodicity Tracking Area Update (TAU) time parameter or a normal periodicity Tracking Area Update time parameter.

2. The method according to claim 1, wherein,
   the terminal receives a paging message of the network side in the active window time interval and does not receive the paging message of the network side in the dormant time interval after entering the idle mode.

3. The method according to claim 2, wherein,
   when the network element of the network side is a mobility management network element of the network side, the terminal activity time parameter of the terminal is determined according to at least one of a subscribed terminal activity time parameter, a reference terminal activity time parameter of a network element of a user plane, a reference terminal activity time parameter of a terminal side, and an operator policy.

4. The method according to claim 2, wherein,
when the network element of the network side is a network element of a user plane at the network side, the terminal activity time parameter of the terminal is determined according to at least one of a reference terminal activity time parameter of a network element of the user plane, a reference terminal activity time parameter of a terminal side, and an operator policy.

5. The method according to claim 1, wherein,
the idle-mode power-saving parameter further comprises a long periodicity Tracking Area Update (TAU) time parameter, and a value of the long periodicity TAU parameter is greater than a value of a normal periodicity Tracking Area Update time parameter.

6. The method according to claim 1, wherein,
the network element of the network side further determines a connection mode power-saving parameter of the terminal and notifies the connection mode power-saving parameter to the terminal, the connection mode power-saving parameter comprises a long discontinuous reception parameter, and a value of a data transceiving turn-off time in the long discontinuous reception parameter is greater than a value of a data transceiving turn-off time in a normal discontinuous reception parameter.

7. The method according to claim 1, wherein,
the network element of the network side determines that the terminal is a power-saving terminal according to a power-saving indication sent by the terminal, or,
the network element of the network side determines that the terminal is a power-saving terminal according to an international mobile subscriber identification number (IMSI) indication of the terminal or an access point name (APN).

8. The method according to claim 1, wherein,
the mobility management network element of the network side determines a value used for the long periodicity Tracking Area Update time parameter in the idle mode and a value used for the long discontinuous reception parameter in the connection mode for the power-saving terminal according to an operator policy.

9. The method according to claim 1, wherein,
a mobility management network element of the network side does not perform a downlink paging directing at the terminal in a dormant time interval of the terminal; and a network element of a user plane at a network side does not send a downlink data packet directing at the terminal in a dormant time interval of the terminal.

10. A terminal power-saving device, comprising: a power-saving parameter receiving module and a power-saving execution module; wherein,
the power-saving parameter receiving module is configured to: receive an idle-mode power-saving parameter from a network side; and
the power-saving execution module is configured to: execute a power-saving operation according to the idle-mode power-saving parameter after the terminal enters an idle mode;
the power-saving execution module is configured to: execute the power-saving operation in a sleep time interval of the idle-mode power-saving parameter, receive a paging message of the network side in an active window time interval of the sleep time interval, and not receive the paging message of the network side in a dormant time interval of the sleep time interval after the terminal enters the idle mode, a value of the sleep time interval is same with a value of a long periodicity Tracking Area Update (TAU) time parameter or a normal periodicity Tracking Area Update time parameter.

11. The terminal power-saving device according to claim 10, wherein,
the terminal power-saving device further comprises a reference power-saving parameter sending module, configured to send a power-saving indication or a reference terminal activity time parameter to the network side according to a static configuration of the terminal and/or an operator policy.

12. A network-side power-saving device, comprising a power-saving parameter determining module and a power-saving parameter sending module; wherein,
the power-saving parameter determining module is configured to: determine an idle-mode power-saving parameter of a terminal; and
the power-saving parameter sending module is configured to: send the idle-mode power-saving parameter to the terminal,
the power-saving parameter determining module is further configured to: determine a long periodicity Tracking Area Update (TAU) time parameter in the idle-mode power-saving parameter, wherein a value of the long periodicity Tracking Area Update time parameter is greater than a value of a normal periodicity Tracking Area Update time parameter,
or,
the power-saving parameter determining module is further configured to:
determine a connection mode power-saving parameter of the terminal, wherein the connection mode power-saving parameter comprises a long discontinuous reception parameter, and a value of a data transceiving turn-off time in the long discontinuous reception parameter is greater than a value of a data transceiving turn-off time in a normal discontinuous reception parameter.

13. The network-side power-saving device according to claim 12, wherein,
the network-side power-saving device further comprises a reference power-saving parameter receiving module;
the reference power-saving parameter receiving module is configured to: receive at least one of a subscribed terminal activity time parameter, a reference terminal activity time parameter of a network element of a user plane, a reference terminal activity time parameter of a terminal side; and
the power-saving parameter determining module is configured to: determine a terminal activity time parameter in the idle-mode power-saving parameter of the terminal according to at least one of the subscribed terminal activity time parameter, the reference terminal activity time parameter of the network element of the user plane, the reference terminal activity time parameter of the terminal side, and an operator policy; wherein, the activity time parameter comprises an active window time interval and a dormant time interval, an operation in the active window time interval is corresponding to an operation of receiving a paging message of the network side by the terminal in the idle mode, and an operation in the dormant time interval is corresponding to an operation of not receiving the paging message of the network side by the terminal in the idle mode.

14. The network-side power-saving device according to claim 12, wherein,
the network-side power-saving device further comprises a power-saving execution module; and
the power-saving execution module is configured to: when a network element of the network side to which the power-saving execution module belongs is a mobility management network element, not perform a downlink paging directing at the terminal in the dormant time interval of the terminal; when a network element of the network side to which the power-saving execution module belongs is a network element of a user plane at the network side, not send a downlink data packet directing at the terminal in the dormant time interval of the terminal; and when a network element of the network side to which the power-saving execution module belongs is a machine type communication interworking function network element, not perform a downlink terminal activation request directing at the terminal in the dormant time interval of the terminal.

15. A terminal power-saving method, comprising:
a mobility management network element of a network side notifying a terminal activity time parameter of a terminal to a machine type communication interworking function network element (MTCIWF) of a network side or a network element of a user plane of the network side, wherein, the terminal activity time parameter comprises a sleep time interval parameter, the sleep time interval comprises one or more active window time intervals and dormant time intervals; a value of the sleep time interval is same with a value of a long periodicity Tracking Area Update (TAU) time parameter or a normal periodicity Tracking Area Update time parameter; and
the MTCIWF or the network element of the user plane of the network side not sending downlink signaling or downlink data to the terminal in the dormant time interval of the terminal.

16. The terminal power-saving method according to claim 15, wherein,
the mobility management network element of the network side directly notifies a terminal activity time parameter of the terminal to the MTCIWF through a T5 interface, or,
the mobility management network element of the network side notifies the terminal activity time parameter of the terminal to a Home Subscriber server, the Home Subscriber server stores the terminal activity time parameter in subscription data or terminal context information, and the mobility management network element of the network side notifies the stored terminal activity time parameter of the terminal to the MTCIWF when receiving terminal routing inquiry information of the MTCIWF directing at the terminal.

17. The terminal power-saving method according to claim 15, wherein,
the mobility management network element of the network side carries the terminal activity time parameter of the terminal in a refusal message sent to the network element of the user plane of the network side after receiving a downlink data notification message sent by the network element of the user plane of the network side.

* * * * *